(12) United States Patent
Miyazaki

(10) Patent No.: US 8,311,280 B2
(45) Date of Patent: Nov. 13, 2012

(54) IMAGE PROCESSING APPARATUS AND IMAGE PROCESSING METHOD

(75) Inventor: Yasuyoshi Miyazaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 117 days.

(21) Appl. No.: 12/841,022

(22) Filed: Jul. 21, 2010

(65) Prior Publication Data

US 2011/0026767 A1     Feb. 3, 2011

(30) Foreign Application Priority Data

Jul. 28, 2009 (JP) ................................ 2009-175389

(51) Int. Cl.
*G06K 9/00* (2006.01)
(52) U.S. Cl. ...................................................... 382/103
(58) Field of Classification Search .................. 382/103; 369/99; 348/157
See application file for complete search history.

(56) References Cited

U.S. PATENT DOCUMENTS

| 7,298,412 B2 * | 11/2007 | Sannoh et al. ................ 348/348 |
| 8,031,066 B2 * | 10/2011 | LaRue ....................... 340/539.1 |
| 2001/0019364 A1 * | 9/2001 | Kawahara ..................... 348/362 |
| 2005/0013496 A1 * | 1/2005 | Bruls et al. .................... 382/239 |
| 2006/0044422 A1 * | 3/2006 | Miyazaki ..................... 348/234 |
| 2007/0014432 A1 * | 1/2007 | Tsunashima ................... 382/103 |
| 2009/0059007 A1 * | 3/2009 | Wagg et al. ................... 348/157 |

FOREIGN PATENT DOCUMENTS

JP         04-170870 A       6/1992

* cited by examiner

*Primary Examiner* — Vikkram Bali
(74) *Attorney, Agent, or Firm* — Canon U.S.A., Inc. IP Division

(57) ABSTRACT

An apparatus stores a luminance signal and a color signal extracted from a tracking area in image data and determines a correlation with the stored luminance signal, thereby extracting an area where a specified object exists in another image data to update the tracking area using the position information of the extracted area. If a sufficient correlation cannot be obtained from the luminance signal, the apparatus makes a comparison with the stored color signal to determine whether the specified object is lost. The apparatus updates the luminance signal every time the tracking area is updated, but does not update the color signal even if the tracking area is updated or updates the color signal at a period longer than a period at which the luminance signal is updated.

20 Claims, 11 Drawing Sheets

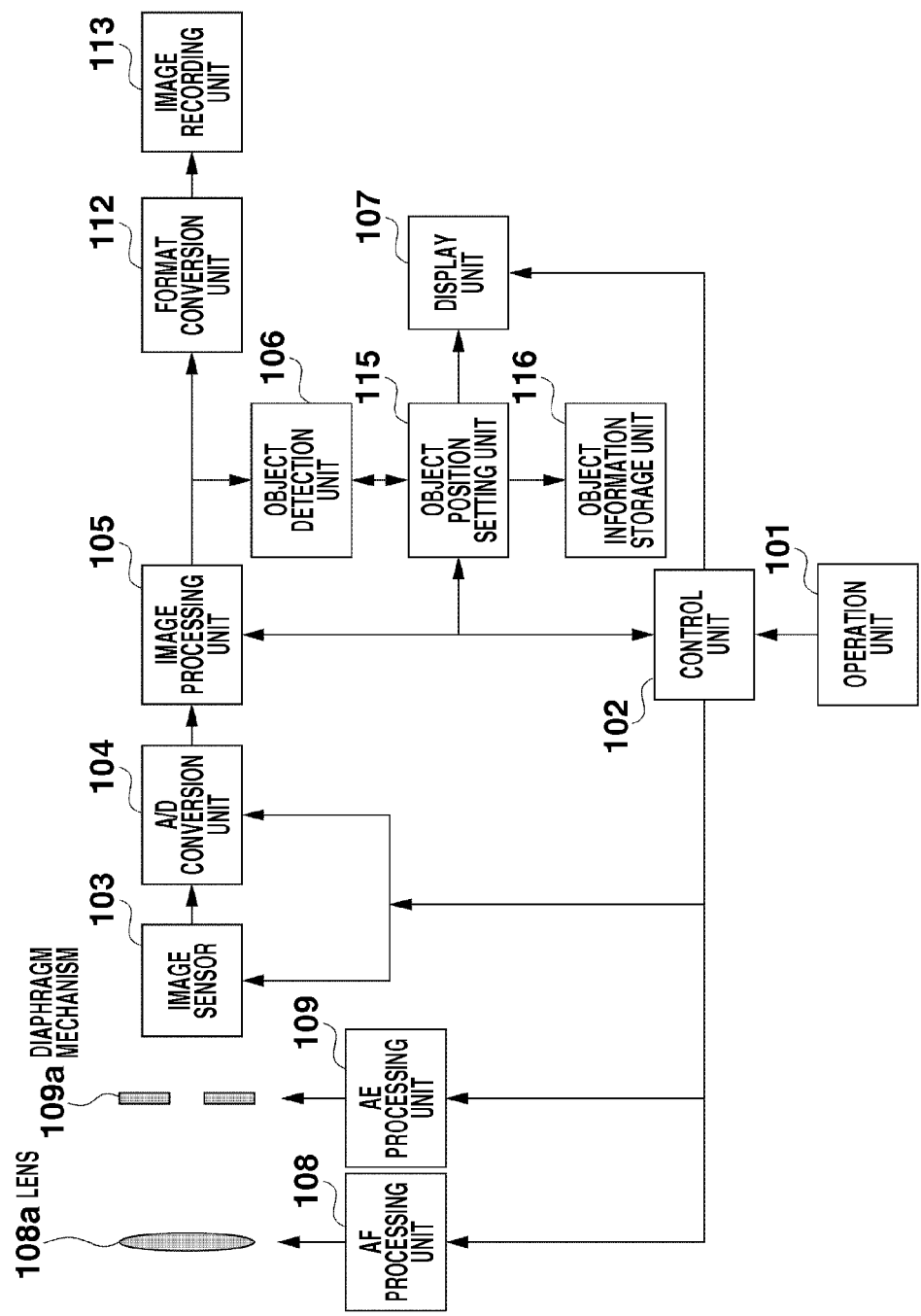

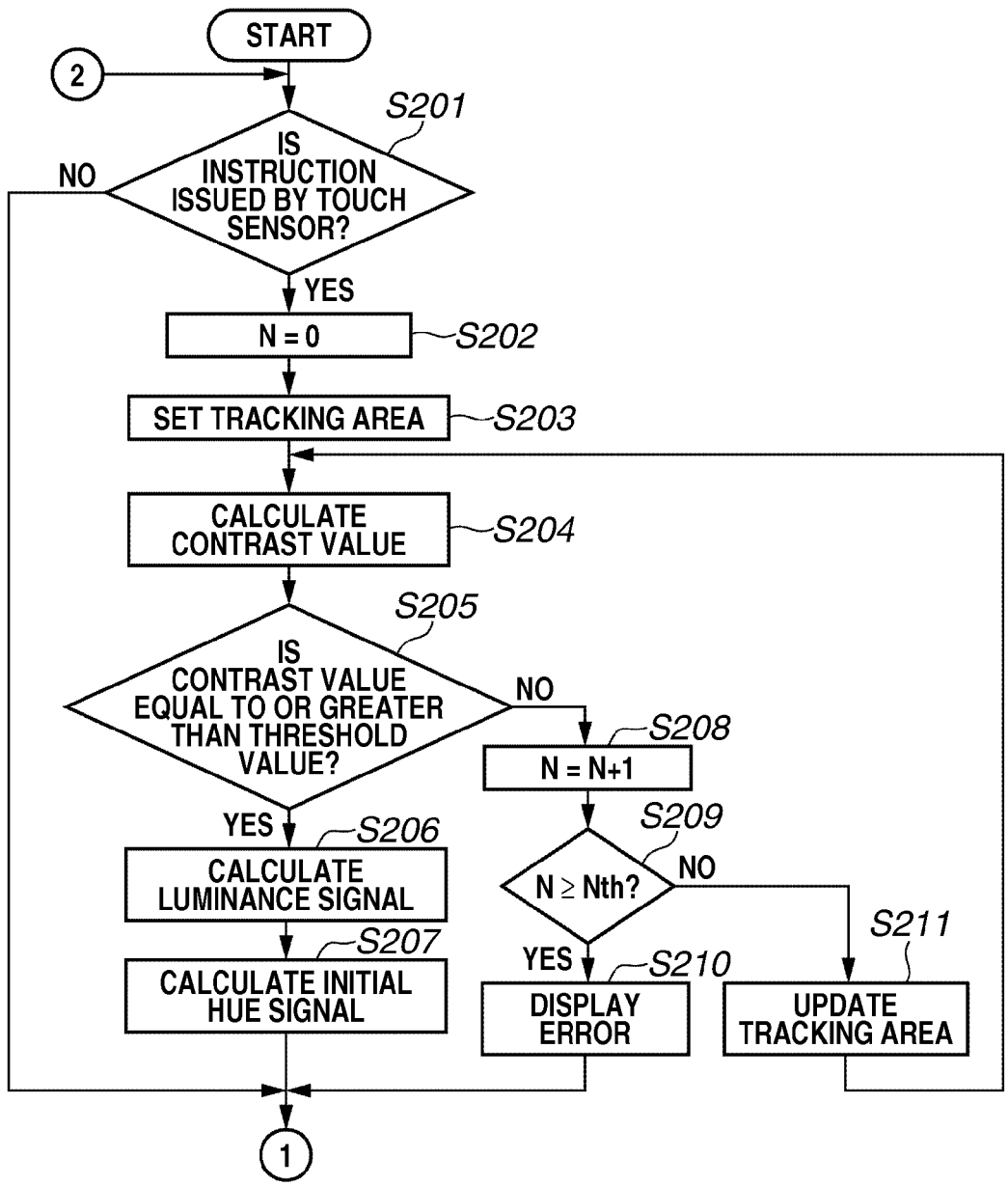

FIG.3

| HUE (Hue) | NUMBER OF PIXELS |
|---|---|
| 0~ | |
| 40~ | 3 |
| 80~ | |
| 120~ | 4 |
| 160~ | |
| 200~ | 16 |
| 240~ | 2 |
| 280~ | |
| 320~ | |

…

IMAGE PROCESSING APPARATUS AND IMAGE PROCESSING METHOD

BACKGROUND OF THE INVENTION

1. Field of the Invention

The present invention relates to a function to track a specified object in an image.

2. Description of the Related Art

Some digital cameras, video cameras, or monitoring camera systems in which a camera is communicatively connected to a computer have a function to track a specified object in an image by continuously detecting the specified object in a movie.

Japanese Patent Application Laid-Open No. 04-170870, for example, discusses a configuration in which an object to be tracked is specified from a frame image, a luminance signal in the area of the object is stored and an area most similar to the stored luminance signal is extracted from another frame image, thereby tracking the object.

FIGS. 7A and 7B are schematic diagrams illustrating a method for tacking an object using a luminance signal in the area of the object. FIG. 7A illustrates a frame image in a movie captured by a digital camera. Suppose that the face of a person who looks to the right is specified as an object to be tracked. A tracking frame indicating the object to be tracked is displayed on the monitor of a digital camera with the tracking frame superposed on the image to surround the face of the person.

The digital camera stores each of pixels of luminance signals in an object area to be tracked surrounded by the tacking frame. Thereafter, in the frame image, a comparison area equal in size to the object area to be tracked is set, and the sum total of differences of luminance signals between the pixels in the object area to be tracked and in the comparison area is obtained. The position of the comparison area is sequentially shifted and the sum total of differences of luminance signals in each position is obtained to detect the position of the comparison area where the sum total of differences is the smallest.

In the other frame image, the area having a pattern (shape) of the luminance signal most similar to a pattern of the luminance signal in the object area to be tracked in a frame image is determined as an area where the same object as an object to be tracked exists and the tacking frame is updated.

FIG. 7B illustrates the state of update. In FIG. 7B, the position of the tacking frame is updated so that the luminance signal in the tacking frame exists in the area having the pattern of the luminance signal most correlative to that of the luminance signal in the area in the tacking frame in FIG. 7A. The stored pattern of the luminance signal is updated to a pattern of the luminance signal in a newly set tracking frame. Such an operation is repeated to track a specified object in a movie.

FIGS. 8A to 8C are schematic diagrams illustrating issues to be solved in a method for tracking an object using the luminance signal of an object area.

In a frame image illustrated in FIG. 8A, the face of a person is specified as an object to be tracked. In a frame image illustrated in FIG. 8B, the face of the person as an object to be tracked is behind a tree as an obstacle. In the frame image illustrated in FIG. 8B, if an area most correlative to the pattern of the luminance signal in the area in the tracking frame illustrated in FIG. 8A is detected and set as anew tracking frame, apart of the face and apart of the tree being the obstacle are included in the area of a new tracking frame. In a frame image illustrated in FIG. 8C, an area where a part of the tree being the obstacle exists is selected as an area highly correlative to the pattern of the luminance signal in the tracking frame. In subsequent frame images, the tree may be continuously tracked.

To avoid this, even in the area having the pattern of the luminance signal most correlative to that of the stored luminance signal in the area in the tacking frame, if the correlation is not greater than a predetermined value, it is determined that an object to be tracked is lost and tracking is stopped. In other words, the area having the pattern of the luminance signal most correlative to the pattern of the luminance signal in the tracking frame of the frame image illustrated in FIG. 8A is detected in the frame image illustrated in FIG. 8B. However, since it is determined that the correlation does not reach the predetermined value, the tracking frame is deleted in the frame image illustrated in FIG. 8C. Thereby, if a different object may be set as an object to be tracked en route, it is possible to stop tracking.

Such a process for stopping tracking causes another issue. When a tracking is performed using a correlation between the patterns of luminance signals, a change in the direction of an object or in the attitude of the object temporarily and substantially changes the correlation between the patterns of luminance signals.

FIGS. 9A to 9D illustrate such a change described above. FIGS. 9A to 9D are schematic diagrams illustrating another issue to be solved in a method for tracking an object using a luminance signal in the area of the object.

In a frame image illustrated in FIG. 9A, the face of a person is specified as an object to be tracked. In a frame image illustrated in FIG. 9B, the person turns to the other side to conceal the face of the person who looks to the right, which causes only the back of the head of the person to appear. In a frame image illustrated in FIG. 9C, the person turns to the left to conceal the back of the head, which causes the face of the person who looks to the left to appear. In the frame images illustrated in FIGS. 9A to 9C, the person as an object to be tracked merely changes its direction. However, a correlation between the patterns of the luminance signals does not reach a predetermined value during that time, so that the tracking frame may be deleted in the frame images as illustrated in FIGS. 9C and 9D.

Thus, it is difficult to find whether the reason the correlation between the luminance signals is lowered is attributed to the tracking of a different object or a mere change in the direction of an object to be tracked.

It is also difficult in the case where a tracking is performed based on the correlation between the patterns of the luminance signals using a color signal such as a chroma signal or a hue signal instead of a luminance signal.

SUMMARY OF THE INVENTION

According to an aspect of the present invention, an apparatus configured to perform tracking by detecting a tracking area of an object from a movie including a plurality of pieces of image data includes a setting unit configured to set the tracking area in image data, a storage unit configured to store a first signal and a second signal extracted from the tracking area, and a detection unit configured to extract an area having a signal in which a difference between the signal and the first signal is smallest from the image data and to update the tracked area with the extracted area, wherein if the detection unit cannot extract an area having a signal in which a difference between the signal and the first signal is smaller than a threshold value from the image data, the detection unit determines whether an area having a signal in which a difference between the signal and the second signal stored in the storage unit is smaller than a threshold value can be extracted, and if the area cannot be extracted, the detection unit resets the tracking area, and if the area can be extracted, the detection unit continues updating of the tracking area, and wherein when the tracking area is updated, the storage unit updates the first signal.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram illustrating a configuration of a digital camera according to a first exemplary embodiment of the present invention.

FIGS. 2A and 2B illustrate a flow chart indicating tracking determination processing of the digital camera according to the first exemplary embodiment.

FIG. 3 is a table illustrating an initial hue signal stored in an object information storage unit according to the first exemplary embodiment.

DESCRIPTION OF THE EMBODIMENTS

Figure 2B:
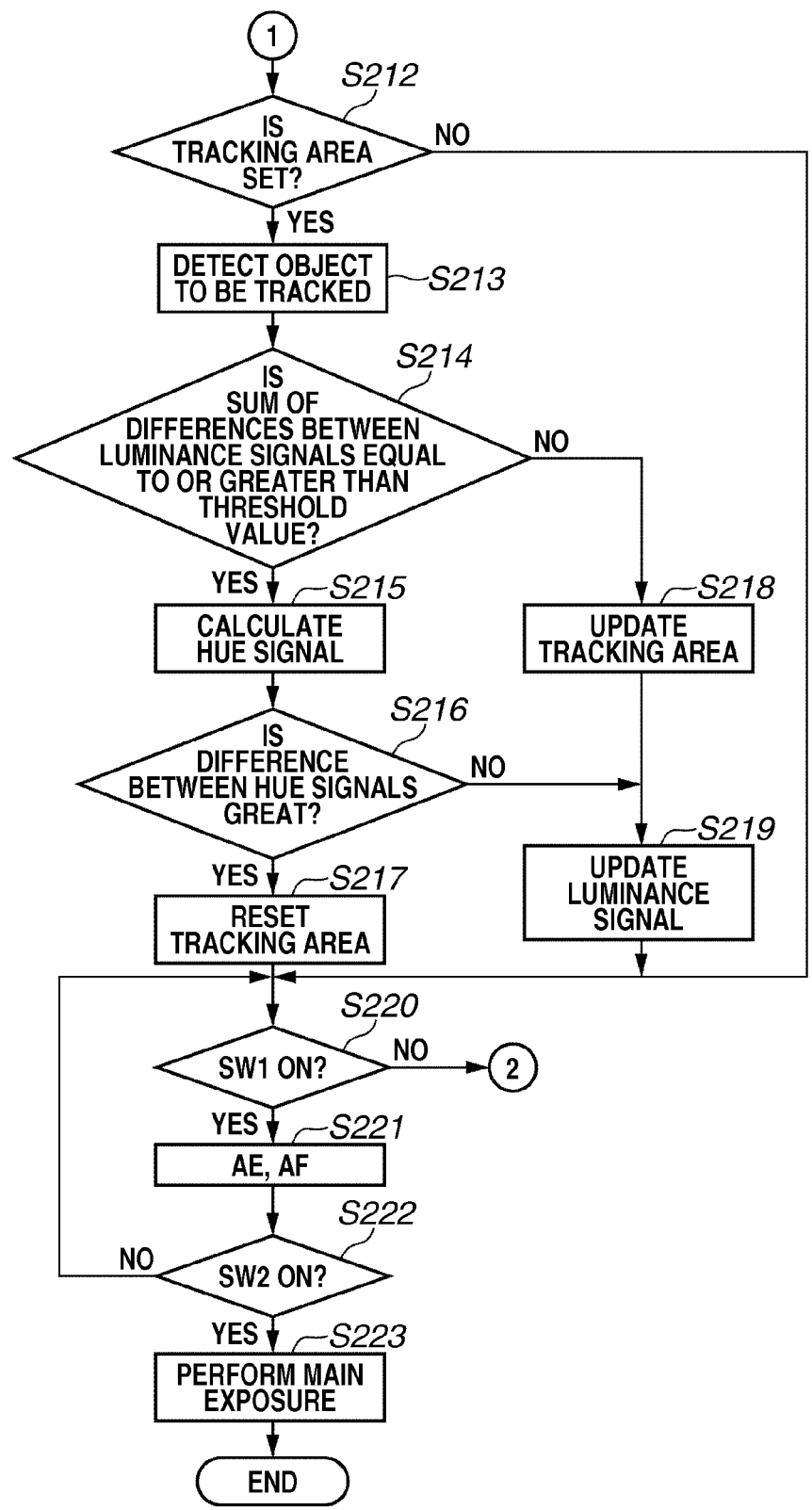

Various exemplary embodiments, features, and aspects of the invention will be described in detail below with reference to the drawings.

In a first exemplary embodiment of the present invention, described below is an example of a digital camera being an imaging apparatus as an image processing apparatus having a function to track a specified object in a movie. The present invention is also applicable to an imaging apparatus such as a digital video camera or a monitor camera system or a calculation apparatus such as a computer for a server communicatively connected to a plurality of cameras. In other words, the present invention is applicable to an apparatus functioning as an image processing apparatus having a function to track a specified object in a movie.

FIG. 1 is a block diagram illustrating a configuration of a digital camera according to a first exemplary embodiment of the present invention.

An operation unit 101 includes a switch and a button operated by an operator of the digital camera to input various instructions to the digital camera. The operation unit 101 further includes a shutter switch and a touch sensor (whereby operation can be made by touching the screen of a display unit 107). The operator can specify the position of an object to be tracked using the touch sensor. Information about the position of the object specified by the touch sensor is transferred to an object position setting unit 115 via a control unit 102. Needless to say, an object to be tracked may be specified by the operation unit excluding the touch sensor. An object that is the shortest in distance or an object in motion may be automatically selected as an object to be tracked.

The control unit 102 controls the operation of the entire digital camera and controls each unit according to instructions from the operation unit 101.

An image sensor 103 is a photoelectric conversion element for converting a received object image to an electric charge according to amount of exposure. A charge-coupled device (CCD) image sensor or a complementary metal-oxide semiconductor (CMOS) image sensor is used as the photoelectric conversion element.

An A/D conversion unit 104 subjects an analog signal output from the image sensor 103 to processing such as sampling, gain adjustment, and A/D conversion, and outputs the processed signal as image data of a digital signal.

An image processing unit 105 subjects the image data of a digital signal output from the A/D conversion unit 104 to various types of image processing and outputs image data composed of the processed luminance signal and color difference signals. The various types of image processing include white balance processing, chromatic aberration correction processing, false color suppression processing, distortion aberration correction processing, edge emphasis processing, or noise reduction processing.

An object detection unit 106 determines the position of the object to be tracked and the area occupied by the object from an image based on position information output to the object position setting unit 115 by the operation unit 101 when tracking is started. The object detection unit 106 sets a rectangular area centering about coordinates specified by the operation unit 101, for example, and extends the rectangular area until a contrast value calculated from the image data in the area exceeds a predetermined value. When the contrast value calculated from the image data in the area exceeds a predetermined value, the position and the range of the rectangular area at that point are set as a tracking area. Alternatively, if the object detection unit 106 has a face detection function and the coordinates specified by the operation unit 101 overlap the face of a person or are in the vicinity of the face, the area occupied by the face may be set as a tracking area.

The object detection unit 106 acquires the image data output from the image processing unit 105 after the tracking is started and detects a position in new image data of the object to be tracked with reference to the luminance signal in the tracking area extracted from the image data of the preceding frame. Specifically, the object detection unit 106 extracts the area that is most correlative to the pattern of the luminance signal in the previously stored tracking area from the new image data. The extracted area is set as a new tracking area to update the position and the range of the tracking area and information of the pattern of the luminance signal stored in an object information storage unit 116 is updated. The object detection unit 106 determines a hue signal from the image data in the tracking area determined when the tracking is started.

The object position setting unit 115 receives information about the position of the object specified by the operator using the touch sensor in the operation unit 101 and about the position and the range of the tracking area from the object detection unit 106. The object position setting unit 115 notifies the display unit 107 of the information.

The object information storage unit 116 stores the hue signal in the tracking area determined by the object detection unit 106 when the tracking is started as an initial hue signal. Furthermore, the object information storage unit 116 stores the luminance signal in the tracking area determined when the tracking is started, and every time the tracking area is updated, the luminance signal is updated to the luminance signal determined from the updated tracking area.

The display unit 107 includes a liquid crystal screen and displays a movie using image data processed by the image processing unit 105. The display unit 107 displays a tracking frame encompassing a tracking area with the tracking frame superposed on the movie to clarify the position and the range of the tracking area of which the object position setting unit 115 notifies the display unit 107.

An auto-focus (AF) processing unit 108 adjusts the position of a lens 108a according to an AF evaluation value obtained by the control unit 102 from the image data output by the image processing unit 105 to change an image-forming position of an object image incident on the image sensor 103.

An auto-exposure (AE) processing unit 109 adjusts the aperture diameter of a diaphragm mechanism 109a according to an object luminance obtained by the control unit 102 from the image data output by the image processing unit 105 to change a light quantity incident on the image sensor 103.

A format conversion unit 112 converts the format of image data of the digital signal output by the image processing unit 105 to a format such as JPEG and outputs it to an image storage unit 113.

The image storage unit 113 stores image data whose format is converted to another format, output from the format conversion unit 112, into a memory (not shown) in the digital camera or an external memory inserted into the digital camera.

The operation of the digital camera is described below.

FIGS. 2A and 2B illustrate a flow chart indicating tracking determination processing of the digital camera according to the present exemplary embodiment.

An operator of the digital camera, turning on a power supply switch included in the operation unit 101, causes the control unit 102 to detect that tuning-on and supply an electric power to the units of the digital camera. Thereby, the image sensor 103 continuously generates image data according to an object image and the display unit 107 displays a movie in real time based on the image data output via the image processing unit 105. The flow chart in FIGS. 2A and 2B then starts.

In step S201, the control unit 102 determines whether any point on the screen of the display unit 107 is touched by a touch sensor included in the operation unit 101. If any point on the screen of the display unit 107 is touched (YES in step S201), that is to say, if the operator of the digital camera issues instructions as to the position of an object to be tracked, the processing proceeds to step S202. If any point is not touched (NO in step S201), the processing proceeds to step S212.

In step S202, the control unit 102 notifies the object detection unit 106 of the coordinates of the touched point on the screen via the object position setting unit 115. The object detection unit 106 sets a variable N to zero.

In step S203, the object detection unit 106 sets a tracking area with a predetermined size centering about the coordinates of which the control unit 102 notifies the object detection unit 106 to first image data being a frame image composing the movie read from the image sensor 103. The predetermined size is set to a trackable minimum size.

In step S204, the object detection unit 106 calculates the contrast value of image data in the tracking area.

In step S205, the object detection unit 106 determines whether the contrast value of image data in the tracking area is equal to or greater than a threshold value. If the contrast value of image data in the tracking area is equal to or greater than the threshold value (YES in step S205), the processing proceeds to step S206. This is made to determine whether the image data in the tracking area satisfies the contrast value used for tracking process. The object detection unit 106 sets the tracking area based on the coordinates of the point of which the control unit 102 notifies the object detection unit 106. However, the object detection unit 106 is not notified of information about the size of the object. For this reason, the tracking area initially set by the object detection unit 106 is not always set to a size adequate to track the object. Therefore, the object detection unit 106 determines the contrast value of image data in the tracking area. If the contrast value is small, the object detection unit 106 determines that the tracking area is probably set to only a part of the area of the object specified as an object to be tracked. This is based on the idea that the object to be tracked is independent of a background, so that the contrast value at the boundary between the object to be tracked and the background is to reach a certain degree of magnitude if the tracking area is set to an adequate size. That is also based on the idea that even if the boundary between the object to be tracked and the background is not included in the tracking area and if the contrast value reaches a certain degree of magnitude, the amount of patterns and shapes effective for specifying an object to be tracked reaches a level necessary for tracking.

In step S206, since it is determined that the tracking area is set to an adequate size, the object detection unit 106 detects luminance signals for each pixel included in the tracking area. The object detection unit 106 stores the pattern of the luminance signal in which the position and the value of the luminance are associated with each other in the object information storage unit 116.

In step S207, the object detection unit 106 detects color signals for each pixel included in the tracking area. In the present exemplary embodiment, the object detection unit 106 detects a hue signal as a color signal and stores information about the hue signal indicating that what hue and how much it exists in the tracking area in the object information storage unit 116 as an initial hue signal. FIG. 3 lists initial hue signals stored in the object information storage unit 116. All hues are divided into 0 to 360 values and segmented by 40 hues to form groups. The number of pixels outputting hue signals of the groups is stored. The sum total of the number of pixels included in the initial hue signal corresponds to the sum total of the number of pixels existing in the tracking area. In the example illustrated in FIG. 3, the sum total of the pixels included in the tracking area is 25. Alternatively, information about the hue signal may be stored in the form of a histogram with the hue signal as an abscissa and the number of pixels as an ordinate in the object information storage unit 116, instead of grouping hues.

The object detection unit 106 notifies the object position setting unit 115 of the position and size of the set tracking area. The display unit 107 receives the information from the object position setting unit 115 and displays the tracking frame encompassing the tracking area with the tracking frame superposed on the image to clarify the position and range of the tracking area.

If the object detection unit 106 determines that the contrast value of image data in the tracking area is smaller than the threshold value (NO in step S205), the processing proceeds to step S208.

In step S208, the object detection unit 106 increments the variable N (i.e., the variable N is increased by 1).

In step S209, the object detection unit 106 determines whether the variable N reaches a reference value Nth. As described below, in step S211, the object detection unit 106 performs processing whereby to extend the tracking area by a predetermined size. For this reason, the variable N reaching the reference value Nth means that a sufficient contrast value cannot be obtained in the tracking area even if the tracking area is repetitively extended to set to the maximum settable size as the tracking area. If the object detection unit 106 determines that the variable N reaches the reference value Nth (YES in step S209), the processing proceeds to step S210. If the object detection unit 106 determines that the variable N does not reach the reference value Nth (NO in step S209), the processing proceeds to step S211.

In step S210, the object detection unit 106 cannot detect an object to be tracked satisfying the contrast value at the coordinates of the point of which the control unit 102 notifies the object detection unit 106, so that the display unit 107 displays an error indicating a failure in extracting an object to be tracked and the processing proceeds to step S212.

In step S211, since the tracking area does not reach a settable maximum, the object detection unit 106 extends the size by a predetermined amount without changing the center position of the tracking area. The processing returns again to step S204 and the object detection unit 106 calculates the contrast value of image data in the tracking area.

Thus, the processing in steps S204 to S211 is repeated to allow automatically setting the tracking area satisfying the contrast value used for tracking according to instructions issued by the operator using the touch sensor and calculating the pattern of the luminance signal in the tracking area.

In step S212, the control unit 102 determines whether a tracking area is set. If a new tracking area is set according to instructions issued by the operator using the touch sensor (YES in step S212) or if a tracking process described below is successful to update the tracking area, the processing proceeds to step S213. If a tracking area is not set (NO in step S212), the processing proceeds to step S220.

In step S213, the object detection unit 106 extracts the area which is most correlative to the pattern of the luminance signal in the tracking area stored in the object information storage unit 116 from second image data being a frame image newly obtained from the image sensor 103.

Figure 4A:
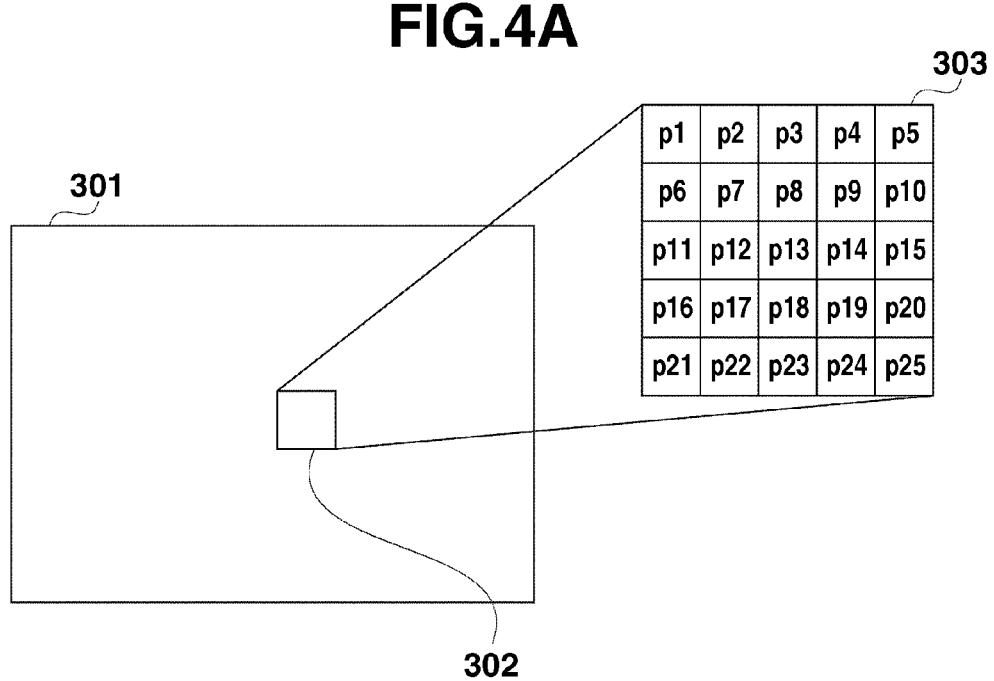
FIG. 4A is a schematic diagram illustrating a tracking area set in first image data and values of a luminance signal for each pixel in the tracking area.
Figure 4B:
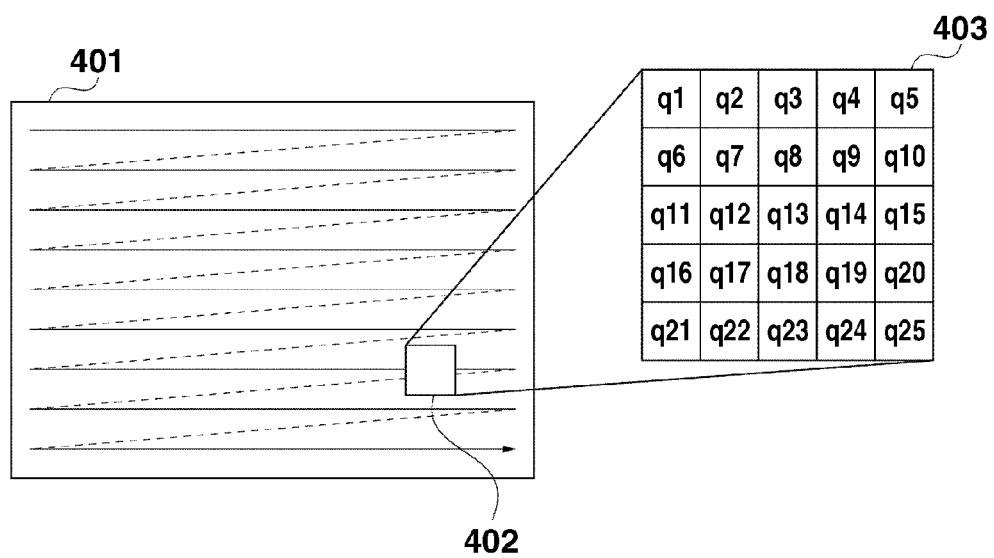
FIG. 4B is a schematic diagram illustrating a comparison area set in second image data and values of a luminance signal for each pixel in the comparison area.

FIGS. 4A and 4B are schematic diagrams illustrating a method for extracting the area which is most correlative to the pattern of the luminance signal in the tracking area stored in the object information storage unit 116. FIG. 4A includes first image data 301, a tracking area 302, and a value 303 (p1 to p25) of luminance signal for each pixel in the tracking area. FIG. 4B includes second image data 401, a comparison area 402, and a value 403 (q1 to q25) of luminance signal for each pixel in the comparison area. The object detection unit 106 sets the comparison area 402 that is equal to the tracking area 302 in the number of pixels and calculates a value (q1 to q25) of a luminance signal in the comparison area in each position while moving along the lines indicated by an arrow in the second image data. The object detection unit 106 determines differences between the luminance signals of pixels existing in the same position in the tracking area 302 and the comparison area 402 (a difference between p1 and q1, a difference between p2 and q2, ..., a difference between p25 and q25) and determines the sum total of the differences. The object detection unit 106 repeats the processing until covering a predetermined range centering on the stored position in the tracking area and determines that an object specified as an object to be tracked exists in the comparison area 402 where the sum total of the differences is reduced to a minimum value.

In step S214, the object detection unit 106 determines whether the sum total of the differences between luminance signals, determined as the minimum value in step S213, is equal to or greater than a threshold value. If the sum total of the differences between luminance signals is equal to or greater than the threshold value (YES in step S214), the object detection unit 106 determines that a great difference between luminance signals probably indicates tracking an object different from the object specified as an object to be tracked. The processing then proceeds to step S215. On the other hand, if the sum total of the differences between luminance signals is smaller than the threshold value (NO in step S214), the object detection unit 106 determines that the same object as that specified as an object to be tracked is probably tracked. The processing then proceeds to step S218.

In step S218, the position and range of the tracking area are updated to the position and range of the comparison area where the sum total is reduced to a minimum value.

In step S215, the object detection unit 106 calculates a hue signal in the area in the same position and range as those of the tracking area from third image data being a frame image newly obtained from the image sensor 103. The reason the object detection unit 106 calculates a hue signal not from the second image data but from the third image data generated later than the second image data is that the object detection unit 106 waits until a change in a temporal state occurring in the object being an object to be tracked converges. For example, if an automobile temporarily approaches on this side of an object selected by an operator or if an object selected by an operator turns from right to left, it is difficult to determine whether the object existing position is identical to an original one unless the change ends. Therefore, if the object detection unit 106 determines that the difference between the luminance signals in the tracking area and the comparison area is great, the object detection unit 106 determines whether the object existing in the same position as the tracking area is the object to be tracked using the hue signal of image data generated later than the image data used for the determination.

In step S216, the object detection unit 106 compares the hue signal determined in step S215 with the initial hue signal stored in the object information storage unit 116 in step S207 to determine whether the difference is great. Specifically, as illustrated in FIG. 3, the object detection unit 106 determines the number of pixels outputting the hue signal which is determined in step S215 and corresponds to each group of hues as is the case with the initial hue signal. If a rate of pixels belonging to the same group as the initial hue signal stored in the object information storage unit 116 in step S207 is equal to or greater than a threshold value (80%, for example) (NO in step S216), the object detection unit 106 determines that the object identical to the object specified as an object to be tracked is probably tracked. The position and range of the tracking area are not updated and the processing proceeds to step S219. On the other hand, if the rate is smaller than the threshold value (YES in step S216), the object detection unit 106 determines that a great difference between hue signals probably indicates tracking an object different from the object specified as an object to be tracked. The processing then proceeds to step S217.

Even if the object to be tracked slowly changes its direction or its attitude, information about the pattern of the luminance signal used for tracking may be updated, every time the tracking area is updated, in order to continue detecting the object to be tracked. If the object changes stepwise and the sum total of the change is great, the correlation between the luminance signals of the objects to be tracked between the image data continuously obtained is not reduced, so that tracking can be continued. However, if it is determined that a failure in tracking probably occurs because only the luminance signal is used, it is difficult to distinguish whether the situation of the object to be tracked is substantially changed or the object to be tracked itself is lost because only the luminance signal is used. In the present exemplary embodiment, if the object detection unit 106 determines that the object to be tracked is probably lost because only the luminance signal is used, the object detection unit 106 determines whether the object to be tracked is lost by using a hue signal different from the luminance signal.

For the hue signal used for determination as to whether the object detection unit 106 loses an object, even if the tracking area is updated, the hue signal obtained from the tracking area set at the time of starting the tracking process is used as it is unlike the luminance signal. This is because, also in the hue signal as is case with the luminance signal, updating the information of the tracking area every time the tracking area is updated makes it difficult to determine whether an object different from the object initially specified by the operator is tracked even if the object different from the object initially specified is tracked. In order for the operator to determine whether the object in the tracking area set when the operator specifies the object to be tracked is lost, it is effective to determine whether the difference between hue signals at the time of starting the tracking process is great.

In the luminance signal, differences between corresponding pixels between the tracking area and the comparison area are obtained, so that a slight change in the direction and attitude of an object significantly changes the value of correlation. In the hue signal, on the other hand, only the number of the hues by kind is compared with each other, so that the hue signal is immune to the direction and attitude of the object. Thus, in a first signal (luminance signal), a method for varying an evaluation value not only by the value of a signal but by the arrangement of the signal to improve a tracking accuracy is used. On the other hand, in a second signal (hue signal), a method of determining an evaluation value only by the value of the signal independently of the arrangement of the signal is used to subsidize the determination as to whether the tracking is successful in the case where the reliability of tracking result in the first signal is not high. Those are combined to allow achieving the tracking process high in position detection accuracy and performing the tracking process whereby not to determine that the object to be tracked is easily lost even if the state of the object to be tracked slightly changes.

In step S217, the object detection unit 106 resets the pattern of the luminance signal in the tracking area stored in the object information storage unit 116 and notifies the object position setting unit 115 of a failure in tracking. The object position setting unit 115 resets information about the position and range of the tracking area and the display unit 107 deletes the displayed tracking frame which is superposed on an image.

In step S219, the object detection unit 106 updates the pattern of the luminance signal in the tracking area stored in the object information storage unit 116 using the luminance signal for each pixel included in the latest tracking area. If the tracking area is updated in step S218, the object detection unit 106 performs updating using the luminance signal in the tracking area in the second image data. If it is determined in step S216 that the object identical to that specified as an object to be tracked is probably tracked, updating is performed using the luminance signal in the tracking area in the third image data. The object detection unit 106 notifies the object position setting unit 115 of information about the position and range of the tracking area where the luminance signal is updated. The display unit 107 receives the information from the object position setting unit 115 and maintains the displayed tracking frame which is superposed on the image according to the information or updates the tracking frame.

In step S214, if the object detection unit 106 determines that the sum of differences between luminance signals is great, the object detection unit 106 may determine whether the sum of differences between hue signals not only in the image data of one frame obtained later than that but in the image data of a plurality of frames is great. This is because if an obstacle appears on this side of an object to be tracked, the obstacle does not always instantly disappear from this side of the object to be tracked, and thereby the object to be tracked can disappear on the image data over several frames. In consideration of the above case, if the sum of differences between luminance signals between the tracking area and the comparison area is great, the hue signal in the comparison area is compared with the initial hue signal over several frames thereafter. When once the difference becomes small, the processing may quickly proceed to step S219.

FIGS. 5A to 5E are schematic diagrams illustrating the tracking process according to the present exemplary embodiment.

Figure 5A:
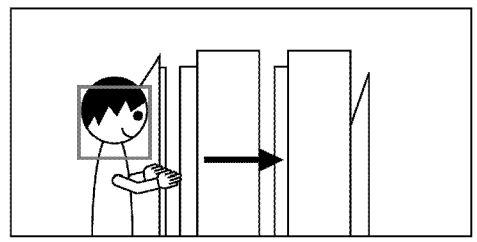
FIG. 5A is a schematic diagram illustrating a person to be tracked who looks to the right on the left side of a screen.
Figure 5B:
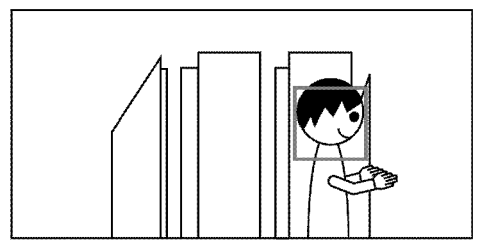
FIG. 5B is a schematic diagram illustrating the person to be tracked who moves rightward.
Figure 5C:
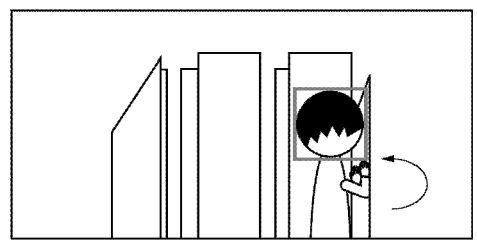
FIG. 5C is a schematic diagram illustrating the person to be tracked who turns to the other side.
Figure 5D:
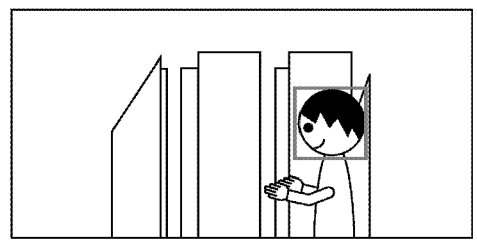
FIG. 5D is a schematic diagram illustrating the person to be tracked who looks to the left.
Figure 5E:
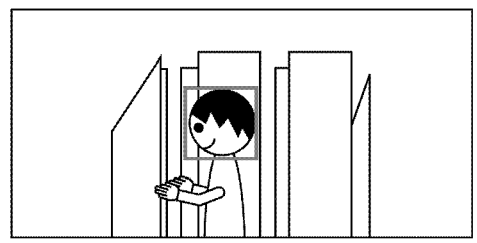
FIG. 5E is a schematic diagram illustrating the person to be tracked who moves leftward.

In a frame image illustrated in FIG. 5A, the operator sets the face of a person who looks to the right as an object to be tracked. In a frame image illustrated in FIG. 5B, the correlation of patterns of the luminance signals is used to be successful in tracking the face of the person. In a frame image illustrated in FIG. 5C, the person turns to the other side to conceal the face of the person who looks to the right, which causes only the back of head of the person to appear. In a frame image illustrated in FIG. 5D, the person turns to the left to conceal the back of the head, which causes the face of the person who looks to the left to appear. In the frame image illustrated in FIG. 5C, the person changes its direction, so that there is no area in the frame image illustrated in FIG. 5C where the correlation with the luminance signal in the tracking area in the frame image illustrated in FIG. 5B is equal to or greater than the threshold value. For this reason, the hue signal in the tracking area in the frame image illustrated in FIG. 5D is compared with the hue signal in the tracking area in the frame image illustrated in FIG. 5A without the position of the tracking area being moved. Although the direction of the face of the person is opposite to each other between FIGS.

5A and 5D, there is no significant difference between the differences of values of color difference signals forming the face, so that it is determined that the tracking is successful in FIG. 5D. The luminance signal in the tracking area in FIG. 5D is newly stored in the object information storage unit 116. The face of the person who looks to the left is detected as an area highly correlative to the newly stored luminance signal from the frame image illustrated in FIG. 5E and is then updated as a new tracked area.

In step S220, the control unit 102 determines whether the shutter switch included in the operation unit 101 is half-pressed (SW1 is turned on). If the shutter switch is half-pressed (YES in step S220), the processing proceeds to step S221. If the shutter switch is not half-pressed (NO in step S220), the processing returns to step S201.

In step S221, the control unit 102 instructs the AF processing unit 108 and the AE processing unit 109 to perform AF and AE processing operations, respectively. If the tracking area is set, the AF and AE processing operations are performed in which greater weighting is assigned to the tracking area than in the case where the tracking area is not set.

In step S222, the control unit 102 determines whether the shutter switch included in the operation unit 101 is fully pressed (SW2 is turned on). If the shutter switch is fully pressed (YES in step S222), the processing proceeds to step S223. If the shutter switch is not fully pressed (NO in step S222), the processing returns to step S220.

In step S223, the control unit 102 performs main exposure to generate still image data and causes the format conversion unit 112 to convert the generated image data into a format for processing and the image storage unit 113 to store the converted format into an external memory.

As described above, in the present exemplary embodiment, the correlation of the pattern of a luminance signal is used to perform the tracking process of the object. If the object to be tracked is probably lost, the correlation of a hue signal is used to determine whether tracking is successful.

In the tracking using a luminance signal, if both of the value and arrangement of a signal do not accurately agree, the object is not regarded as identical, allowing lowering the possibility of erroneous tracking. On the other hand, if an object changes its direction or an obstacle temporarily appears, an object to be tracked is liable to be lost. In the tracking using a hue signal, if the arrangement of a signal does not agree but the value of a signal accurately agrees, the object is regarded as identical, so that even if the object changes its direction, the object to be tracked is difficult to be lost. On the other hand, an object similar in color is probably erroneously tracked.

In the present exemplary embodiment, these plural types (two types) of signals are interpolatively used to perform the tracking process, thereby allowing the realization of the tracking process which does not easily lose an object while the possibility of erroneous tracking is lowered.

In the first exemplary embodiment, in step S207, the object information storage unit 116 stores the initial hue signal. The initial hue signal is not updated while the tracking process is continued. A second exemplary embodiment of the present invention is different from the first exemplary embodiment in that a hue signal stored in the object information storage unit 116 is periodically updated in consideration that the color temperature of a light source with which an object is irradiated may be changed by the object moving outdoors or entering a store.

As is the case with the first exemplary embodiment, an image processing apparatus according to the second exemplary embodiment is also the digital camera illustrated in FIG. 1.

Figure 6A:
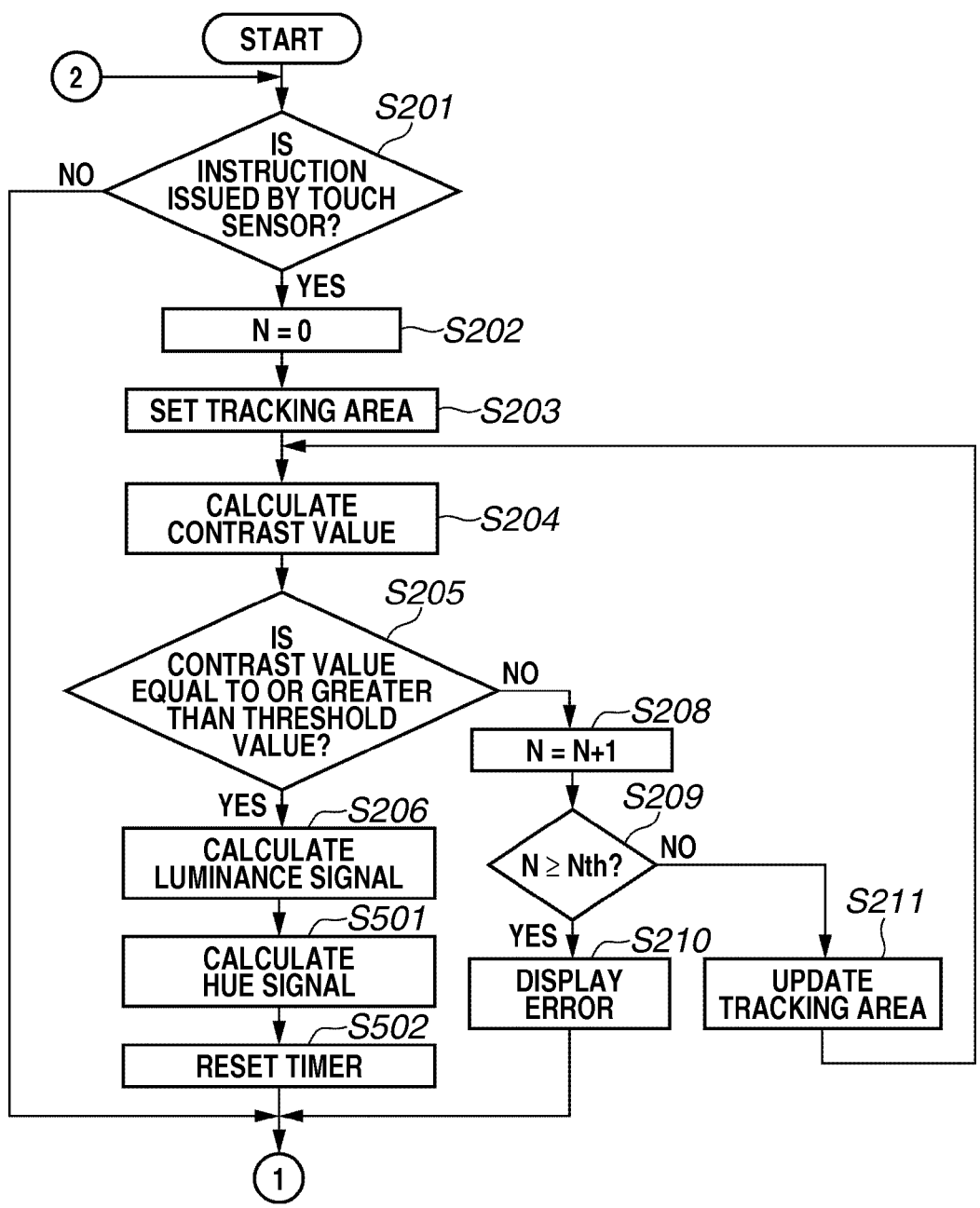
FIGS. 6A and 6B illustrate a flow chart illustrating tracking determination processing for the digital camera according to a second exemplary embodiment of the present invention.
Figure 6B:
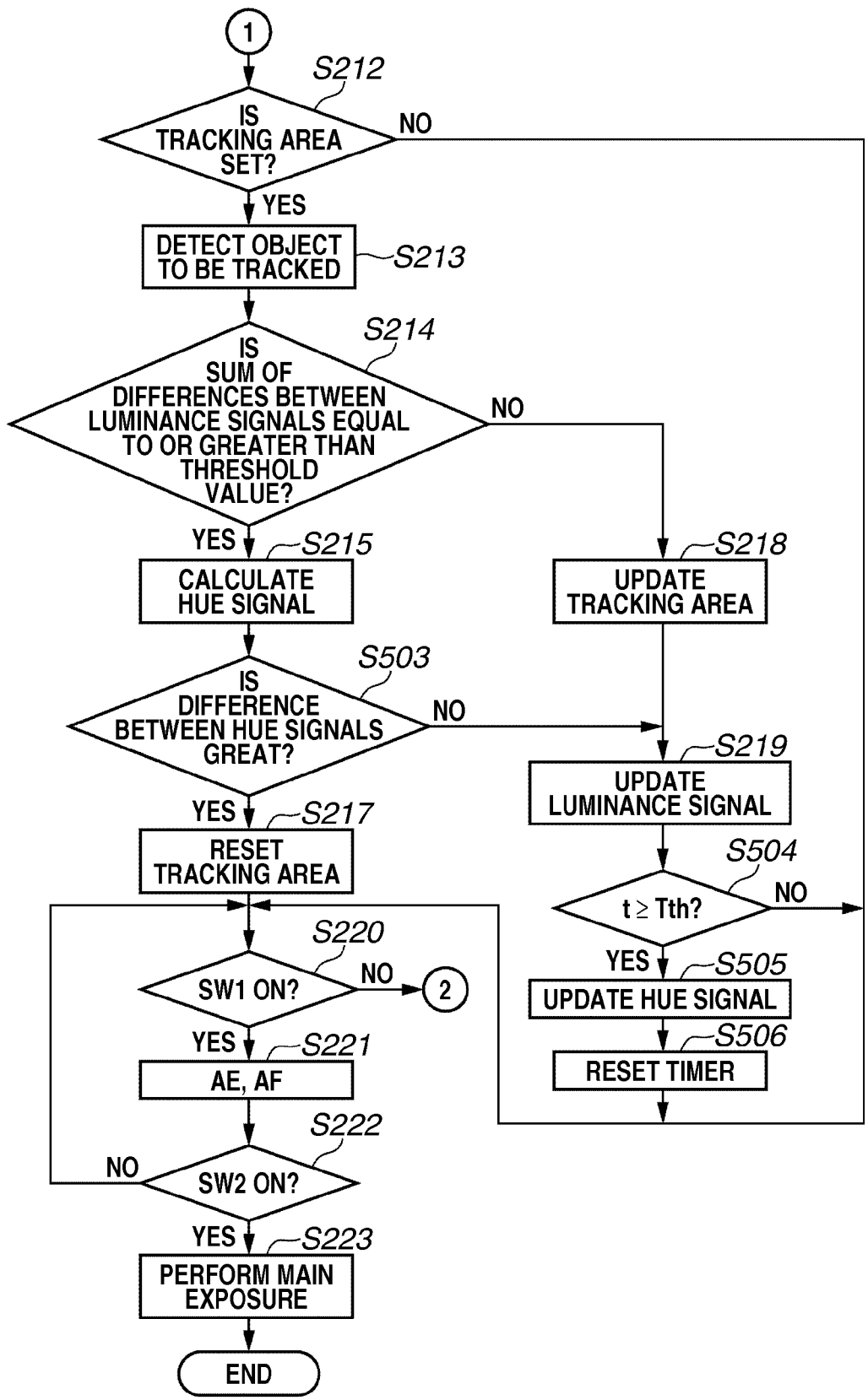
Figure 7A:
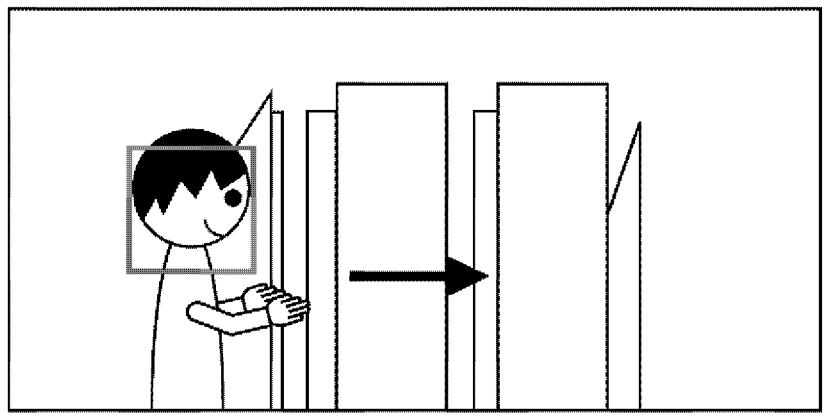
FIG. 7A is a schematic diagram illustrating a person to be tracked who looks to the right on the left side of a screen.
Figure 7B:
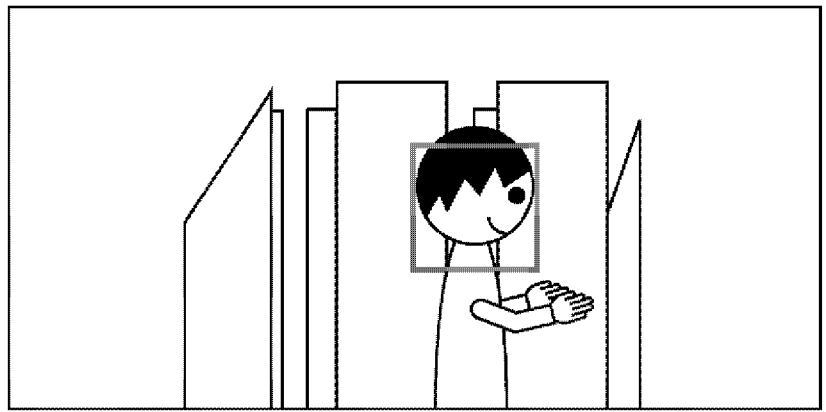
FIG. 7B is a schematic diagram illustrating the person to be tracked who moves rightward.
Figure 8A:
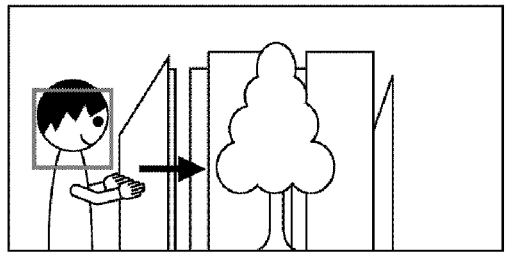
FIG. 8A is a schematic diagram illustrating a person to be tracked who looks to the right on the left side of a screen.
Figure 8B:
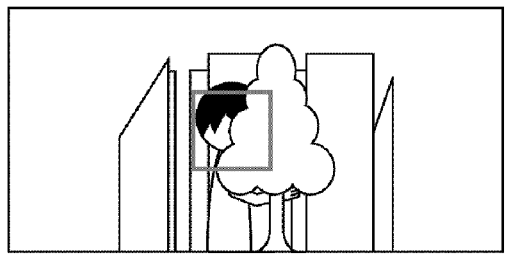
FIG. 8B is a schematic diagram illustrating the person to be tracked who is behind a tree.
Figure 8C:
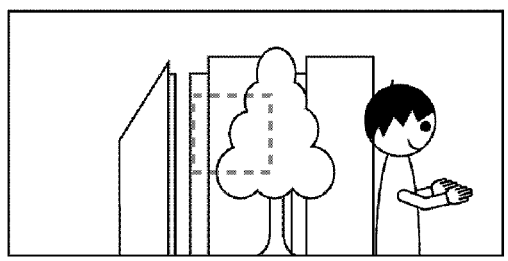
FIG. 8C is a schematic diagram illustrating the person to be tracked who appears from behind the tree.
Figure 9A:
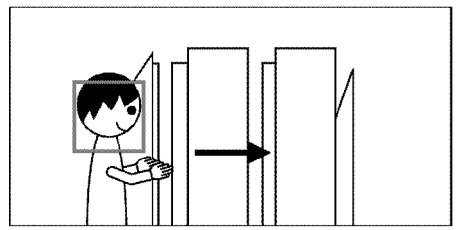
FIG. 9A is a schematic diagram illustrating a person to be tracked who looks to the right on the left side of a screen.
Figure 9B:
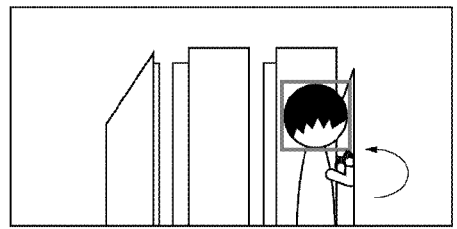
FIG. 9B is a schematic diagram illustrating the person to be tracked who moves rightward and turns to the other side.
Figure 9C:
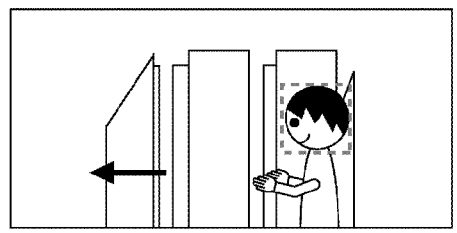
FIG. 9C is a schematic diagram illustrating the person to be tracked who looks to the left.
Figure 9D:
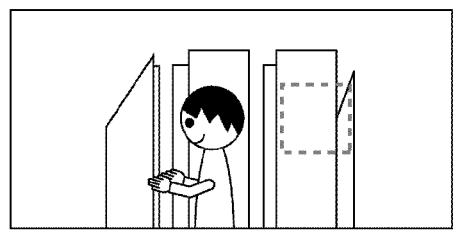
FIG. 9D is a schematic diagram illustrating the person to be tracked who moves leftward.

FIGS. 6A and 6B illustrate a flow chart illustrating tracking determination processing for the digital camera according to the second exemplary embodiment. The same reference numbers are allocated to the steps where the processing similar to that in the flow chart illustrated in FIGS. 2A and 2B is performed. The processing different from that in the flow chart illustrated in FIGS. 2A and 2B is mainly described below.

In step S205, if the object detection unit 106 determines that image data in the tracking area satisfies a contrast value, then in step S206, the object detection unit 106 detects the luminance signal included in the tracking area and stores the pattern of the luminance signal in the object information storage unit 116.

In step S501, the object detection unit 106 detects a hue signal for each pixel included in the tracking area and stores information about the hue signal illustrated in FIG. 3 indicating that what hue and how much it exists in the tracking area in the object information storage unit 116 as a hue signal.

In step S502, the object detection unit 106 resets a timer (not shown) to start measuring time. The processing proceeds to step S212. The timer acts to detect timing at which the hue signal is updated. In the present exemplary embodiment, if the timer reaches a predetermined value Tth, the hue signal stored in the object information storage unit 116 is updated.

In step S213, the object detection unit 106 extracts the area most correlative to the pattern of the luminance signal in the tracking area stored in the object information storage unit 116 from the second image data. In step S214, the object detection unit 106 determines whether the sum total of the differences between the luminance signals in the most correlative area and the tracking area is equal to or greater than a threshold value. If the object detection unit 106 determines that the sum total of the differences is smaller than the threshold value (NO in step S214), the processing proceeds to step S218 to update information about the position and range of the tracking area. If the object detection unit 106 determines that the sum total of the differences is equal to or greater than the threshold value (YES in step S214), the processing proceeds to step S215. The object detection unit 106 calculates the hue signal in the area whose position and range are the same as those of the tracking area. The processing then proceeds to step S503.

In step S503, the object detection unit 106 compares the hue signal determined in step S215 with the hue signal stored in the object information storage unit 116 to determine whether the difference is great. If the difference is great (YES in step S503), the processing proceeds to step S217 to reset the tracking area. If the difference is not great (NO in step S503), the processing proceeds to step S219.

In step S219, the object detection unit 106 updates the pattern of the luminance signal in the tracking area using the luminance signal for each pixel included in the tracking area.

In step S504, the object detection unit 106 determines whether the time t measured by the timer reaches the predetermined value Tth. If the time t reaches the predetermined value Tth (YES in step S504), the processing proceeds to step S505. If the time t does not reach the predetermined value Tth (NO in step S504), the processing proceeds to step S220. The predetermined value Tth is set in units of several seconds or dozen seconds, for example. The update period of a hue signal in the tracking area is set to a period of time sufficiently longer than the update period of a luminance signal in the tracking area updated every several frames. This is because frequently updating the hue signal, as is the case with the luminance signal, causes the hue signal to be susceptible to influences caused when an object changes its direction or an obstacle temporarily appears.

In step S505, the object detection unit 106 extracts the hue signal from the image data in the tracking area used for updating the pattern of the luminance signal in step S219 and updates the hue signal illustrated in FIG. 3 stored in the object information storage unit 116.

In step S506, the object detection unit 106 resets the timer to start again measuring time.

In the present exemplary embodiment, the object detection unit 106 updates also the hue signal stored in the object information storage unit 116 at a period insusceptible to a temporal change in an object to be tracked. This prevents an object to be tracked from being lost even if the hue signal of the object is changed by a change in environment surrounding the object such as a difference between outdoor and indoor conditions or a change in illumination.

In the present exemplary embodiment, the timer is reset every time the hue signal is updated, and the updating of the hue signal is permitted if time measured by the timer reaches the predetermined value. However, the present invention is not limited to the above exemplary embodiment. If a variation such as luminance, hue, or saturation around an object to be tracked exceeds a reference value, the hue signal stored in the object information storage unit 116 may be updated by determining that a change may occur also in the hue signal of the object to be tracked.

In the present exemplary embodiment, although the hue signal is actually extracted from the updated tracking area to update the hue signal stored in the object information storage unit 116, the present invention is not limited to the above exemplary embodiment. For example, the digital camera is provided with a color temperature detection circuit for detecting the color temperature of ambient light of an object and the hue signal stored in the object information storage unit 116 may be corrected according to a change in color temperature detected by the color temperature detection circuit. Alternatively, the digital camera calculates the value of white balance in the area excluding an object and the hue signal stored in the object information storage unit 116 may be corrected according to a change in the value of the white balance.

In the above-described exemplary embodiments, objects between frames are tracked using the correlation of patterns of luminance signals. If it is determined that a failure probably occurs in tracking the object using only the correlation of luminance signals, it is determined whether a failure in tracking the object occurs using the hue signal. However, the present invention is not limited to the above exemplary embodiments. Other color signals such as a color difference signal, or a signal indicating saturation may be used instead of the hue signal or these signals may be used together.

The sum total of differences of signal levels for each pixel illustrated in FIGS. 4A and 4B may be determined using not only the luminance signal but also a saturation signal or a hue signal to track the object. If it is determined that a failure probably occurs in tracking the object using only the correlation of the saturation signal or the hue signal, it may be determined whether a failure in tracking the object occurs using the luminance signal. In this case, for example, luminance signals are divided into a plurality of groups according to their levels and the number of pixels outputting the luminance signals belonging to each group is stored, so that determination can be made similar to the case where the hue signal is used in the above first and second exemplary embodiments.

The first and second exemplary embodiments using a luminance signal which can represent in detail the shape of an object may be more preferable than a case where a color signal is used, in that tracking can be performed with a high accuracy with a detailed pattern of an object distinguished.

The above exemplary embodiments can be realized software-wise by a computer (CPU or MPU) of a system or apparatus in addition to the aforementioned imaging apparatus or image reproducing apparatus. Such a configuration may be employed that image data is received via a storage medium or wired/wireless communication and the image data is subjected to tracking process.

A computer program itself supplied to a computer to realize the above exemplary embodiments through the computer also realizes the present invention. In other words, the computer program itself for realizing the functions of the above exemplary embodiments also constitutes the present invention.

The computer program for realizing the above exemplary embodiments may be in any form as long as it is computer readable. The computer program for realizing the above exemplary embodiments is supplied to the computer via a storage medium or wired/wireless communication. When the computer program is supplied via wired/wireless communication, a server on a computer network may be used. In this case, a data file (program file) as a computer program for implementing the present invention is stored in the server. The program file is downloaded to a client computer accessing the server.

In other words, the server providing the client computer with the program file for realizing the above exemplary embodiments also constitutes the present invention.

A storage medium storing an encrypted computer program for realizing the above exemplary embodiments may be distributed to permit installing the program into a computer.

The computer program for realizing the above exemplary embodiments may use the functions of an operating system (OS) currently operating on the computer. Furthermore, the computer program for realizing the above exemplary embodiments may partly be formed of firmware such as an extension board attached to a computer or may be executed by a CPU provided on the extension board.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-175389 filed Jul. 28, 2009, which is hereby incorporated by reference herein in its entirety.

What is claimed is:

1. An apparatus comprising:
  a setting unit configured to set a tracking area in image data;
  a storage unit configured to store a first signal and a second signal extracted from the tracking area; and
  a detection unit configured to extract an area having a signal in which a difference between the signal and the first signal is smallest from the image data and to update the tracked area with the extracted area;
  wherein if the detection unit cannot extract an area having a signal in which a difference between the signal and the first signal is smaller than a threshold value from the image data, the detection unit determines whether an area, having a signal in which a difference between the signal and the second signal is smaller than the threshold value, can be extracted from the image data, and if the area cannot be extracted, the detection unit resets the tracking area, and if the area can be extracted, the detection unit continues updating of the tracking area, wherein when the tracking area is updated, the storage unit updates the first signal, and wherein when a contrast value calculated from the image data in an area exceed a predetermined value, a position and a range of the area at that point are set as the tracking area.

2. The apparatus according to claim 1, wherein, for the first signal, the storage unit stores a value and arrangement of the first signal of each pixel included in the tracking area and, for the second signal, the storage unit stores a value of the second signal of each pixel included in the tracking area.

3. The apparatus according to claim 1, wherein, for the first signal, the storage unit stores values of signals corresponding to each position of pixels included in the tracking area and, for the second signal, the storage unit groups values of each pixel included in the tracking area and stores a number of pixels included in each group.

4. The apparatus according to claim 1, wherein the storage unit stores the first signal and the second signal extracted when the setting unit sets the tracking area.

5. The apparatus according to claim 1, wherein the first signal includes a luminance signal and the second signal includes a color signal.

6. An apparatus comprising:
a setting unit configured to set a tracking area in image data;
a storage unit configured to store a first signal and a second signal extracted from the tracking area in the image data; and
a detection unit configured to extract an area having a signal in which a difference between the signal and the first signal is smallest from the image data and to update the tracked area with the extracted area;
wherein if the detection unit cannot extract an area having a signal in which a difference between the signal and the first signal is smaller than a threshold value from the image data, the detection unit determines whether an area, having a signal in which a difference between the signal and the second signal smaller than a threshold value, can be extracted from the image data, and if the area cannot be extracted, the object detection unit resets the tracking area, and if the area can be extracted, the detection unit continues updating of the tracking area,
wherein while the tracking area is continued to be updated, a period of updating of the second signal is longer than that of updating of the first signal, and
wherein when a contrast value calculated from the image data in an area exceed a predetermined value, a position and a range of the area at that point are set as the tracking area.

7. The apparatus according to claim 6, wherein, for the first signal, the storage unit stores a value and arrangement of the first signal of each pixel included in the tracking area and, for the second signal, the storage unit stores a value of the second signal of each pixel included in the tracking area but does not store an arrangement thereof.

8. The apparatus according to claim 6, wherein, for the first signal, the storage unit stores values of signals corresponding to each position of pixels included in the tracking area and, for the second signal, the storage unit groups values of each pixel included in the tracking area and stores a number of pixels included in each group.

9. The apparatus according to claim 6, wherein the storage unit stores the first signal and the second signal extracted when the setting unit sets the tracking area.

10. The apparatus according to claim 6, further comprising a timer configured to measure a period of updating of the second signal,
wherein, if the tracking area is updated and the measured time reaches a predetermined value, the storage unit updates the second signal.

11. The apparatus according to claim 6, wherein the first signal includes a luminance signal and the second signal includes a color signal.

12. The apparatus according to claim 6, wherein the second signal includes a hue signal, and a value of the second signal is updated according to a change in color temperature of ambient light of the object or a change in value of white balance calculated from the image data.

13. A method comprising:
setting a tracking area in image data;
storing a first signal and a second signal extracted from the tracking area;
extracting an area having a signal in which a difference between the signal and the first signal is smallest from the image data and updating the tracked area with the extracted area;
updating the first signal when the tracking area is updated; and
if an area having a signal in which a difference between the signal and the first signal is smaller than a threshold value cannot be extracted from the image data, determining whether an area having a signal in which a difference between the signal and the second signal is smaller than the threshold value can be extracted from the image data, and if the area cannot be extracted, resetting the tracking area, and if the area can be extracted, continuing updating of the tracking area,
wherein when a contrast value calculated from the image data in an area exceed a predetermined value, a position and a range of the area at that point are set as the tracking area.

14. A method comprising:
setting a tracking area in image data;
storing a first signal and a second signal extracted from the tracking area;
extracting an area having a signal in which a difference between the signal and the first signal is smallest from the image data and updating the tracked area with the extracted area;
updating the second signal at a period longer than a period at which the first signal is updated while the tracking area is continued to be updated; and
if an area having a signal in which a difference between the signal and the first signal is smaller than a threshold value cannot be extracted from the image data, determining whether an area having a signal in which a difference between the signal and the second signal is smaller than the threshold value can be extracted, and if the area cannot be extracted, resetting the tracking area, and if the area can be extracted, continuing updating of the tracking area,
wherein when a contrast value calculated from the image data in an area exceed a predetermined value, a position and a range of the area at that point are set as the tracking area.

15. The method according to claim 14, further comprising:
storing a value and arrangement of the first signal of each pixel included in the tracking area for the first signal; and
storing a value of the second signal of each pixel included in the tracking area for the second signal.

16. The method according to claim 14, further comprising:
  storing values of signals corresponding to each position of pixels included in the tracking area for the first signal; and
  grouping values of each pixel included in the tracking area and storing a number of pixels included in each group for the second signal.

17. A non-transitory storage medium storing a program for causing a computer to execute a method comprising:
  setting a tracking area in image data;
  storing a first signal and a second signal extracted from the tracking area in the image data;
  extracting an area having a signal in which a difference between the signal and the stored first signal is smallest from the image data and updating the tracked area with the extracted area;
  updating the first signal when the tracking area is updated; and
  if an area having a signal in which a difference between the signal and the first signal is smaller than a threshold value cannot be extracted, determining whether an area having a signal in which a difference between the signal and the second signal is smaller than the threshold value can be extracted, and if the area cannot be extracted, resetting the tracking area, and if the area can be extracted, continuing updating of the tracking area,
  wherein when a contrast value calculated from the image data in an area exceed a predetermined value, a position and a range of the area at that point are set as the tracking area.

18. The non-transitory storage medium according to claim 17, further comprising: storing a value and arrangement of the first signal of each pixel included in the tracking area for the first signal; and
  storing a value of the second signal of each pixel included in the tracking area for the second signal.

19. The non-transitory storage medium according to claim 17, further comprising: storing values of signals corresponding to each position of pixels included in the tracking area for the first signal; and
  grouping values of each pixel included in the tracking area and storing a number of pixels included in each group for the second signal.

20. A non-transitory storage medium storing a program for causing a computer to execute a method comprising:
  setting a tracking area in image data;
  storing a first signal and a second signal extracted from the tracking area in the image data;
  extracting an area having a signal in which a difference between the signal and the first signal is smallest from the image data and updating the tracked area with the extracted area;
  updating the second signal at a period longer than a period at which the first signal is updated while the tracking area is continued to be updated; and
  if an area having a signal in which a difference between the signal and the stored first signal is smaller than a threshold value cannot be extracted, determining whether an area having a signal in which a difference between the signal and the stored second signal is smaller than the threshold value can be extracted, and if the area cannot be extracted, resetting the tracking area, and if the area can be extracted, continuing updating of the tracking area,
  wherein when a contrast value calculated from the image data in an area exceed a predetermined value, a position and a range of the area at that point are set as the tracking area.

\* \* \* \* \*